No. 728,799. PATENTED MAY 19, 1903.
H. H. JONES.
PIE MACHINE.
APPLICATION FILED FEB. 24, 1903.
NO MODEL. 2 SHEETS—SHEET 1.
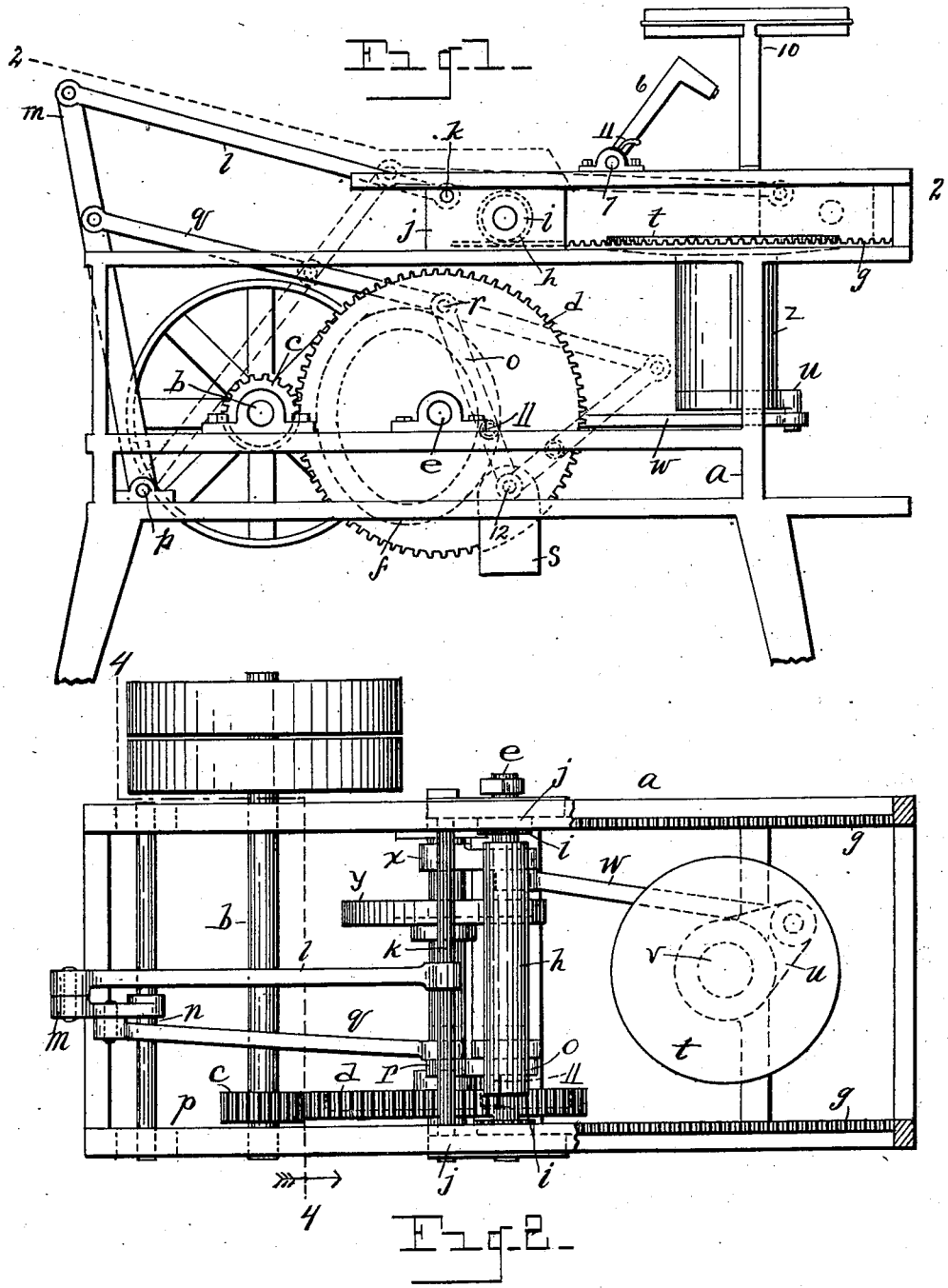
WITNESSES:
INVENTOR.
Harry H. Jones
BY Newell S. Wright
his ATTORNEY No. 728,799. PATENTED MAY 19, 1903.
H. H. JONES.
PIE MACHINE.
APPLICATION FILED FEB. 24, 1903.
NO MODEL. 2 SHEETS—SHEET 2.
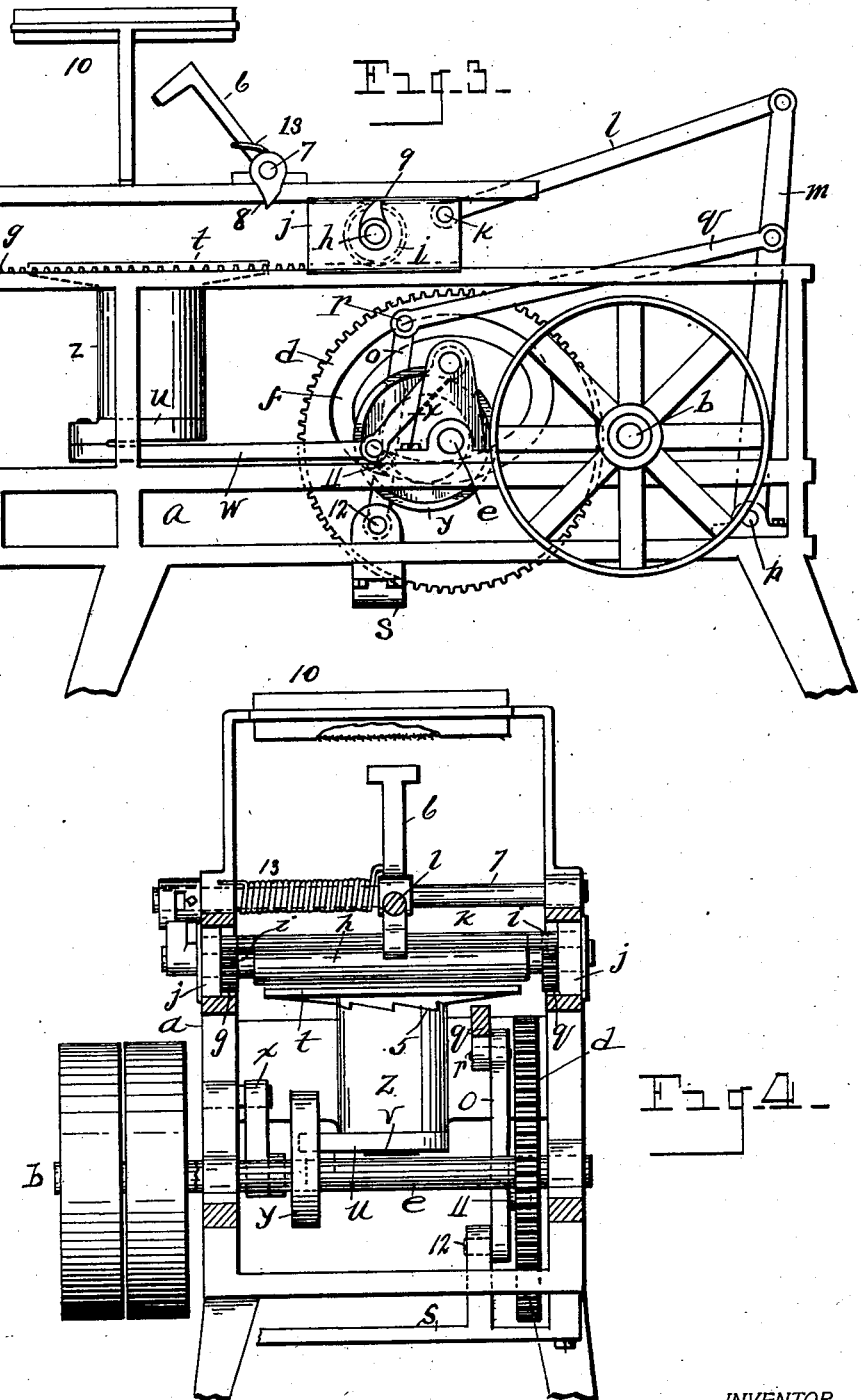

No. 728,799. Patented May 19, 1903.

UNITED STATES PATENT OFFICE.

HARRY H. JONES, OF DETROIT, MICHIGAN, ASSIGNOR TO AUTOMATIC PIE MACHINERY COMPANY, OF DETROIT, MICHIGAN, A CORPORATION OF MICHIGAN.

PIE-MACHINE.

SPECIFICATION forming part of Letters Patent No. 728,799, dated May 19, 1903.

Application filed February 24, 1903. Serial No. 144,725. (No model.)

*To all whom it may concern:*

Be it known that I, HARRY H. JONES, a citizen of the United States, residing at Detroit, county of Wayne, State of Michigan, have invented a certain new and useful Improvement in Pie-Machines, of which the following is a specification, reference being had to the accompanying drawings, which form a part of this specification.

My invention has for its object a pie-machine, the same being more particularly designed and adapted to roll the dough for pie-crusts, although I do not limit myself to any particular use to which the invention may be adapted. I will, however, describe and illustrate my invention as applied to a machine for rolling pie-crusts.

I carry out my invention as hereinafter described and claimed, and illustrated in the accompanying drawings, in which—

Figure 1 is a view in side elevation. Fig. 2 is a view in section on the line 2 2, Fig. 1. Fig. 3 is a view from the opposite side from that shown in Fig. 1. Fig. 4 is a view in section on the line 4 4, Fig. 2.

In the drawings, $a$ represents any suitable supporting structure. A driving-shaft is indicated at $b$, driven from any suitable source of power, said shaft being provided with a pinion $c$, meshing with a cam-gear $d$, mounted upon a shaft $e$, said cam-gear constructed with a cam-groove $f$.

Upon the supporting structure $a$ are rack-bars $g$ $g$. A roller is indicated at $h$, provided at its extremities with gears $i$, meshing with said rack-bars. To actuate the roller $h$, with its bearings $j$ $j$, a connecting-shaft $k$ is engaged with said bearings, with which is connected an arm $l$, jointedly connected upon a lever $m$, which in turn is fulcrumed at its lower end, as indicated at $n$, upon a shaft $p$. An additional arm $q$ is also jointedly connected at its outer end upon the lever $m$, as shown, jointedly, as at $r$, with a fulcrumed arm $o$, provided with a cam-roll traversing the cam $f$. It will be observed that as the cam-gear $d$ rotates the lever $m$ will be advanced and retracted thereby, the advanced position of said lever being indicated in dotted lines, Fig. 1. It will be evident that when the lever $m$ is advanced, as indicated in dotted lines, the roller $h$ will be advanced, the same being rotated by means of its gears $i$ meshing with the rack-bars $g$ $g$, its advanced position being also indicated in dotted lines, Fig. 1. Upon the frame is carried a plate $t$ to hold the dough to be rolled, the roller in its advancing and retracting movement being passed over said plate. When the roller has been advanced thereover, it is desirable to give the plate a partial rotation—as, for example, a quarter-turn—which is accomplished by means of a crank-arm $u$ being actuated by the lever-arm $w$, eccentrically connected, as by an arm $x$, with a disk $y$ upon the shaft $e$. The plate $t$ and the bearing $z$ of its shaft $v$ are preferably constructed with bevel cam-faces, as indicated by the numeral 5, permitting a slight vertical adjustment of the plate $t$, so that when the dough is rolled the second time upon the plate it will be made thinner than at the first rolling. This vertical adjustment will take place simultaneously with a partial rotation of the plate in the manner above described, as will be evident.

The machine is preferably provided with a marker (indicated at 6) upon a shaft 7. Said shaft is provided with a dog 8 to engage a trip-dog 9 in the bearings $j$ as the bearing is moved to and fro, said dogs being so constructed and arranged that the dog 9 may ride in one direction under the dog 8 without actuating the marker; but when the bearing is moved in the opposite direction the dog 9 will engage the dog 8 to trip the marker to make an imprint upon the dough upon the plate.

Any suitable sifting device may be provided—as indicated, for example, at 10—to sprinkle flour upon the plate, the sifter device, however, forming no special feature of my invention and the same being omitted in Fig. 2, as well as the marker 6. The cam-roll is indicated at 11, which traverses the cam $f$, the arm $o$ being shown fulcrumed at its lower end upon the bracket $s$, as shown at 12. The marker may be restored to position by a spring 13.

What I claim as my invention is—

1. In combination a support, a partially-rotatable plate, a stationary bearing therefor, and a roller movable over said plate, said plate and its bearing having adjacent oppositely-beveled faces whereby when the plate is partially rotated it will also be made vertically movable.

2. In combination a support, a partially-rotatable plate, a bearing therefor, the adjacent faces of the plate and its support having oppositely-beveled surfaces, and a rotatable roller, the roller and the plate the one horizontally movable with relation to the other.

3. In combination a support, a plate, a rotatable reciprocatory roller, driving mechanism provided with a cam, and lever mechanism actuated by said cam to reciprocate said roller.

4. In combination a support, a plate, a reciprocatory roller and a marker actuated by the reciprocation of the roller.

5. In combination a support, a shaft, and a plate carried at the top of the shaft, said plate having a simultaneously vertical and partially-rotatable movement.

In testimony whereof I have signed this specification in the presence of two subscribing witnesses.

HARRY H. JONES.

Witnesses:
N. S. WRIGHT,
M. M. STRUBLE.